(12) United States Patent
Biancalana et al.

(10) Patent No.: US 10,717,480 B2
(45) Date of Patent: Jul. 21, 2020

(54) CAR PROVIDED WITH AN ADJUSTABLE AERODYNAMIC APPENDAGE ARRANGED IN A REAR POSITION

(71) Applicant: FERRARI S.p.A., Modena (IT)

(72) Inventors: Matteo Biancalana, Modena (IT); Alessandro Calamita, Formigine (IT); Tommaso Innocenti, Modena (IT)

(73) Assignee: FERRARI S.P.A., Modena (IT)

( * ) Notice: Subject to any disclaimer, the term of this patent is extended or adjusted under 35 U.S.C. 154(b) by 134 days.

(21) Appl. No.: 16/023,040

(22) Filed: Jun. 29, 2018

(65) Prior Publication Data
US 2019/0009842 A1    Jan. 10, 2019

(30) Foreign Application Priority Data

Jul. 4, 2017   (IT) ........................ 102017000074554

(51) Int. Cl.
*B62D 35/00*   (2006.01)
*B62D 37/02*   (2006.01)
*B62D 25/10*   (2006.01)

(52) U.S. Cl.
CPC ........... *B62D 35/007* (2013.01); *B62D 37/02* (2013.01); *B62D 25/105* (2013.01)

(58) Field of Classification Search
CPC ..... B62D 35/007; B62D 37/02; B62D 25/105
USPC .................. 296/180.1, 180.5, 76, 181.5, 208
See application file for complete search history.

(56) References Cited

U.S. PATENT DOCUMENTS

| | | | | |
|---|---|---|---|---|
| 4,174,863 A * | 11/1979 | Gotz | ...................... | B60J 1/2008 296/180.5 |
| 4,738,479 A * | 4/1988 | Filtri | .................... | B62D 35/007 296/15 |
| 6,170,904 B1 | 1/2001 | Schaedlich et al. | | |
| 7,111,898 B2 * | 9/2006 | Rinklin | ................ | B62D 35/007 296/180.1 |
| 8,584,778 B2 * | 11/2013 | Wolf | ...................... | B60K 11/04 180/68.1 |

(Continued)

FOREIGN PATENT DOCUMENTS

| | | |
|---|---|---|
| DE | 102014105513 A1 | 10/2015 |
| DE | 102015101797 A1 | 8/2016 |
| GB | 2502963 A | 12/2013 |

OTHER PUBLICATIONS

Search Report issued in Italian Patent Application No. IT 201700074554, dated Mar. 12, 2018; 9 pages.

*Primary Examiner* — Jason S Morrow
*Assistant Examiner* — E Turner Hicks
(74) *Attorney, Agent, or Firm* — Cantor Colburn LLP

(57) ABSTRACT

Car having: a passenger compartment; a front hood, which is arranged before the passenger compartment; a rear hood, which is arranged behind the passenger compartment and has an upper surface; and an aerodynamic appendage, which is arranged in the area of the rear hood and on the upper surface of the rear hood. The aerodynamic appendage is provided with at least one movable element that is movably mounted to move between a lowered position, in which the movable element rests on the upper surface of the rear hood allowing an air flow only over the movable element, and a raised position, in which the movable element is raised and separated from the upper surface of the rear hood allowing an air flow both over the movable element and under the movable element.

15 Claims, 12 Drawing Sheets

(56) References Cited

U.S. PATENT DOCUMENTS

| | | | | |
|---|---|---|---|---|
| 8,651,211 B2* | 2/2014 | Wolf | .................... | B62D 35/007 180/68.1 |
| 9,434,357 B2* | 9/2016 | Kim | .................... | B62D 35/007 |
| 2006/0043770 A1* | 3/2006 | Preiss | .................. | B62D 35/007 296/180.1 |
| 2006/0186698 A1* | 8/2006 | Roth | .................... | B62D 35/007 296/180.1 |
| 2016/0244106 A1* | 8/2016 | Cardile | ................ | B62D 35/007 |
| 2017/0361882 A1* | 12/2017 | Weber | .................. | B62D 35/007 |

* cited by examiner

US 10,717,480 B2

CAR PROVIDED WITH AN ADJUSTABLE AERODYNAMIC APPENDAGE ARRANGED IN A REAR POSITION

PRIORITY CLAIM

This application claims priority from Italian Patent Application No. 102017000074554 filed on Jul. 4, 2017, the disclosure of which is incorporated by reference.

TECHNICAL FIELD

The present invention relates to a car provided with an adjustable aerodynamic appendage arranged in a rear position.

PRIOR ART

In high-performance cars, the aerodynamics are designed to generate a high aerodynamic downforce (i.e. a high aerodynamic downward pull) while trying to minimize the aerodynamic drag. Consequently, the aerodynamic efficiency of a car is evaluated based on the ratio between the aerodynamic downforce and the corresponding aerodynamic drag: the higher the ratio, the greater the aerodynamic efficiency of the car.

To increase the aerodynamic downforce on the rear axle, it is known the application to the bodywork of a rear spoiler, namely an aerodynamic element that protrudes from the silhouette of the bodywork and deflects upwards the air flow. Please note that the rear spoiler is a "whisker" that protrudes upwards from the bodywork and constitutes an uninterrupted extension of the bodywork. Consequently, the air flow is forced to bypass the rear spoiler, namely to pass over the rear spoiler, with no chance to pass under the rear spoiler.

An alternative to the application of a rear spoiler to the bodywork is the possible application of a rear wing to the bodywork, said wing comprising at least one wing profile that is arranged at a certain distance from the rest of the bodywork and is generally supported by a central support or by two side supports. The wing profile is hit by the air flow both at its upper surface and at its lower surface and generates a downforce by using the same physical principle that allows aircrafts to fly.

The patent application EP3059146A1 discloses a rear spoiler that is integral with the bodywork, is arranged in the rear position and protrudes from the silhouette of the bodywork to deflect upward the air flow so that the air flow touches an upper surface of the rear spoiler. It is provided a through aerodynamic duct, which originates in an inlet opening arranged at an initial end of the rear spoiler and terminates in an outlet opening arranged at a final end of the rear spoiler, so that a part of the air flow that hits the rear spoiler passes over the rear spoiler touching the upper surface of the rear spoiler, and so that the remaining part of the air flow that hits the rear spoiler passes through the rear spoiler through the aerodynamic duct. The aerodynamic duct has an inner bottleneck that is formed by a diverting profile, which projects towards the inside of the aerodynamic duct and is movably mounted to vary its position inside the aerodynamic duct. By varying the position of the diverting profile it is possible to increase/decrease the downforce (i.e. the aerodynamic downward pull) generated by the rear spoiler, thus decreasing/increasing at the same time the aerodynamic drag generated by the rear spoiler. Therefore, the aerodynamic action of the rear spoiler can be adapted (optimized with regard) to the state of motion of the car by acting on the position of the diverting profile.

The patent applications DE102015101797A1, GB2502963A and DE102014105513A1 and the U.S. Pat. No. 6,170,904B1 describe a car having an aerodynamic appendage that is arranged at a rear hood and over an upper surface of the rear hood. The aerodynamic appendage comprises a movable element that is movably mounted to move between a lowered position, in which the movable element rests on the upper surface of the rear hood allowing an air flow only over the movable element, and a raised position, in which the movable element is raised and separated from the upper surface of the rear hood allowing an air flow both over the movable element and under the movable element.

DESCRIPTION OF THE INVENTION

The object of the present invention is to provide a car having an adjustable aerodynamic appendage arranged in a rear position, wherein the car has a high aerodynamic efficiency in the rear area and is at the same time easy and inexpensive to manufacture.

According to the present invention, a car is provided with an adjustable aerodynamic appendage arranged in a rear position, as claimed in the appended claims.

The claims describe preferred embodiments of the present invention forming an integral part of the present disclosure.

BRIEF DESCRIPTION OF THE DRAWINGS

The present invention will now be described with reference to the accompanying drawings showing a non-limiting embodiment, in which.

PREFERRED EMBODIMENTS OF THE INVENTION

Figure 1:
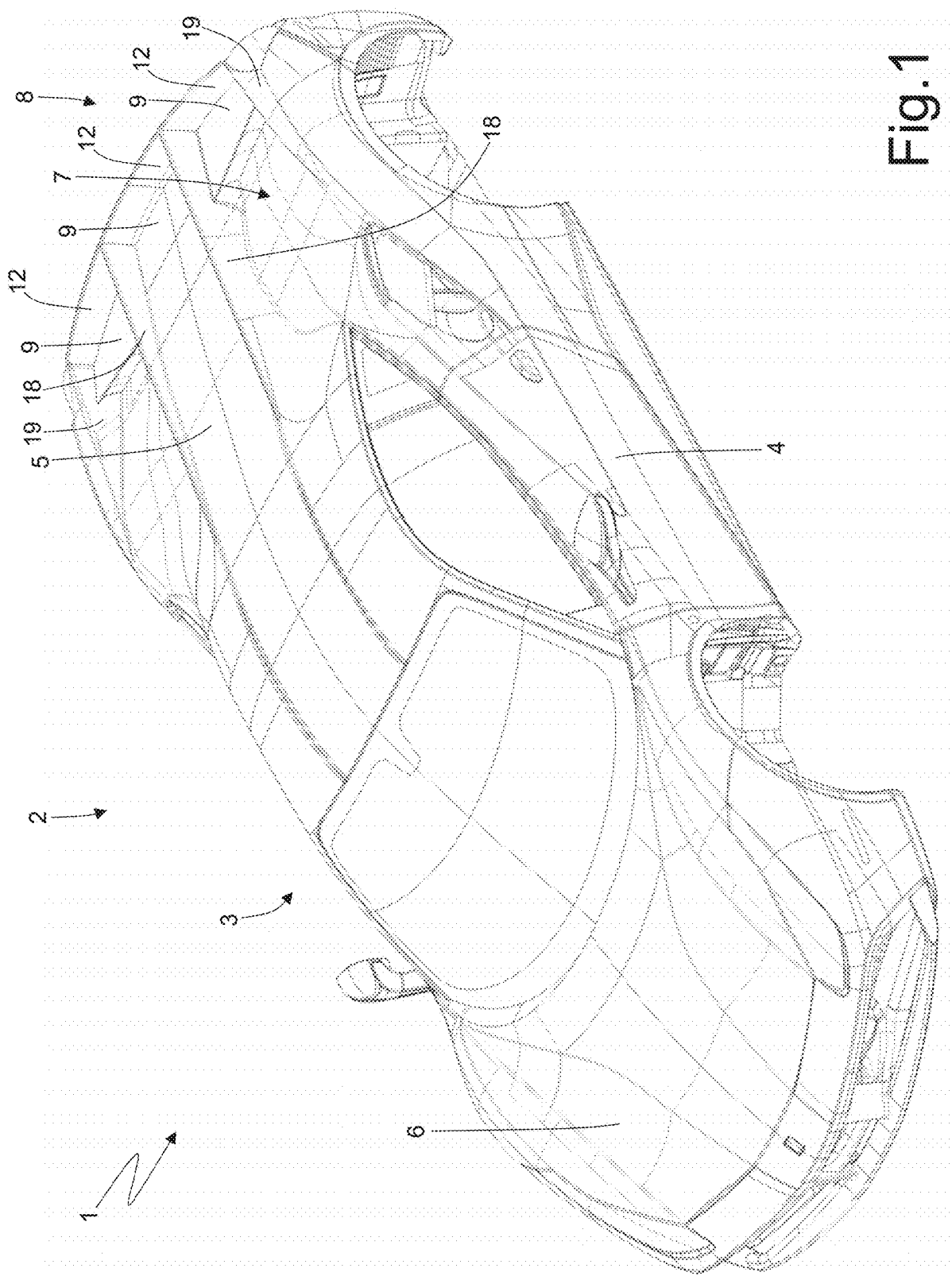
FIGS. 1 and 2 are two front perspective views, with parts removed for clarity's sake, of a car that has been made in accordance with the present invention and is provided with a rear aerodynamic appendage, respectively arranged in a lowered position (maximum downforce) and in a raised position (minimum downforce)
Figure 2:
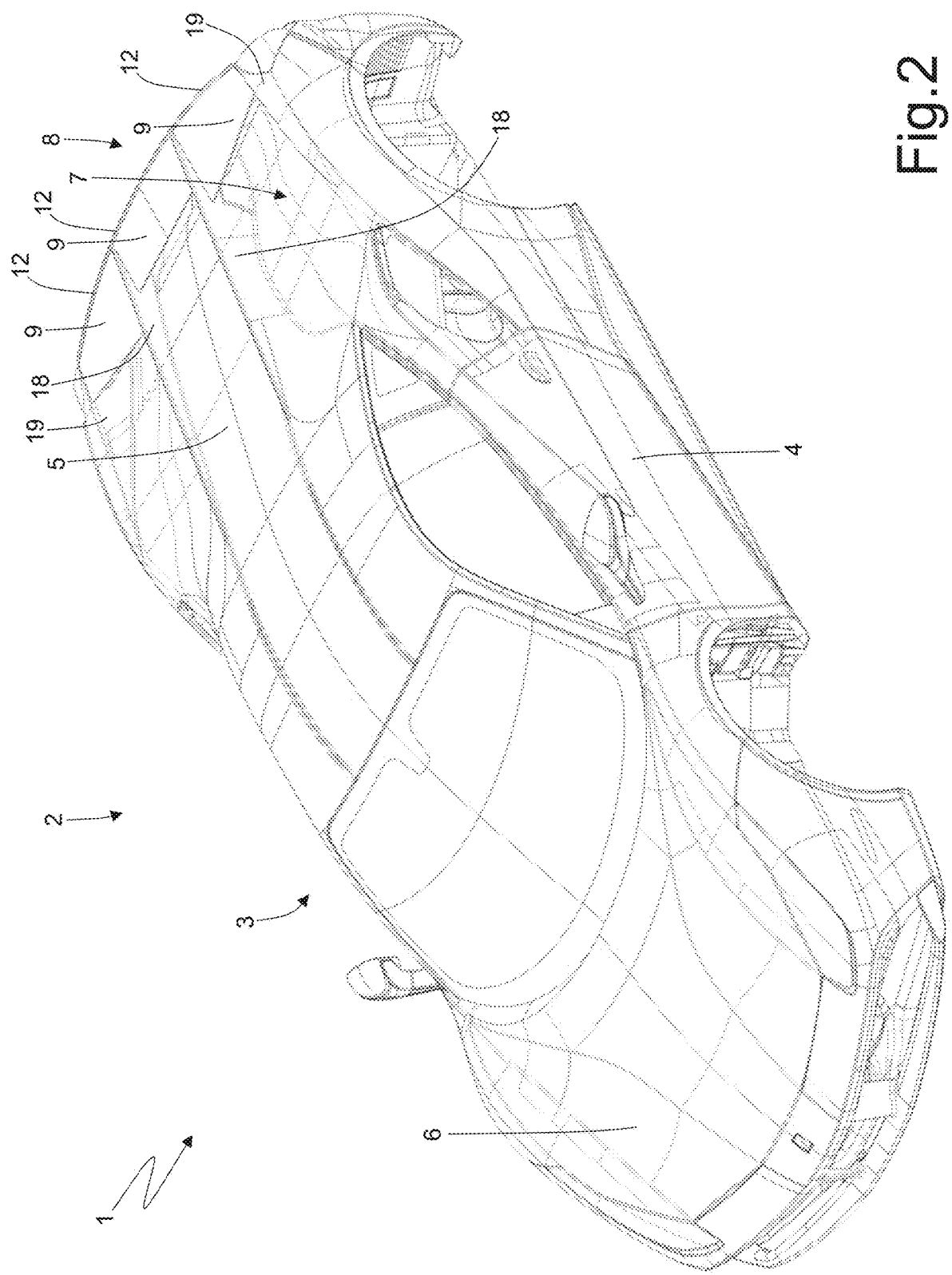

In FIGS. 1 and 2, the number 1 indicates as a whole a car driven by a centrally arranged internal combustion engine.

The car 1 comprises a frame, which supports the internal combustion engine, a pair of front wheels and a pair of rear driving wheels. The frame is covered by a bodywork 2, which includes both transparent elements (a windscreen, movable and/or fixed side windows, a rear window) and opaque elements made of sheet metal, of plastic material or of composite material.

Between the front wheels and the rear wheels there is a passenger compartment 3 that is accessed through a pair of doors 4 (which are part of the bodywork 2). Behind the passenger compartment 3 there is a rear compartment (i.e. a motor compartment) that houses the internal combustion engine and is closed by a rear hood 5 (which is part of the bodywork 2). Before the passenger compartment 3 there is a front compartment (i.e. a luggage compartment) that is available to accommodate luggage or the like and is closed by a front hood 6 (which is part of the bodywork 2).

In the embodiment shown in the accompanying figures, the internal combustion engine of the car 1 is arranged in a central/rear position (namely behind the passenger compartment 3). According to a different and perfectly equivalent embodiment not shown, the internal combustion engine of the car 1 is arranged in a front position (i.e. before the passenger compartment 2).

The rear hood 5 has an upper surface 7, which is shaped like a slide, is oriented upwards, and during the ride of the car 1 is touched by an air flow that climbs over the roof of the passenger compartment 3. It is provided an aerodynamic appendage 8, which is arranged at the rear hood 5 and over the upper surface 7 of the rear hood 5; in particular, the aerodynamic appendage 8 is arranged at the terminal (rear) part of the rear hood 5.

Figure 3:
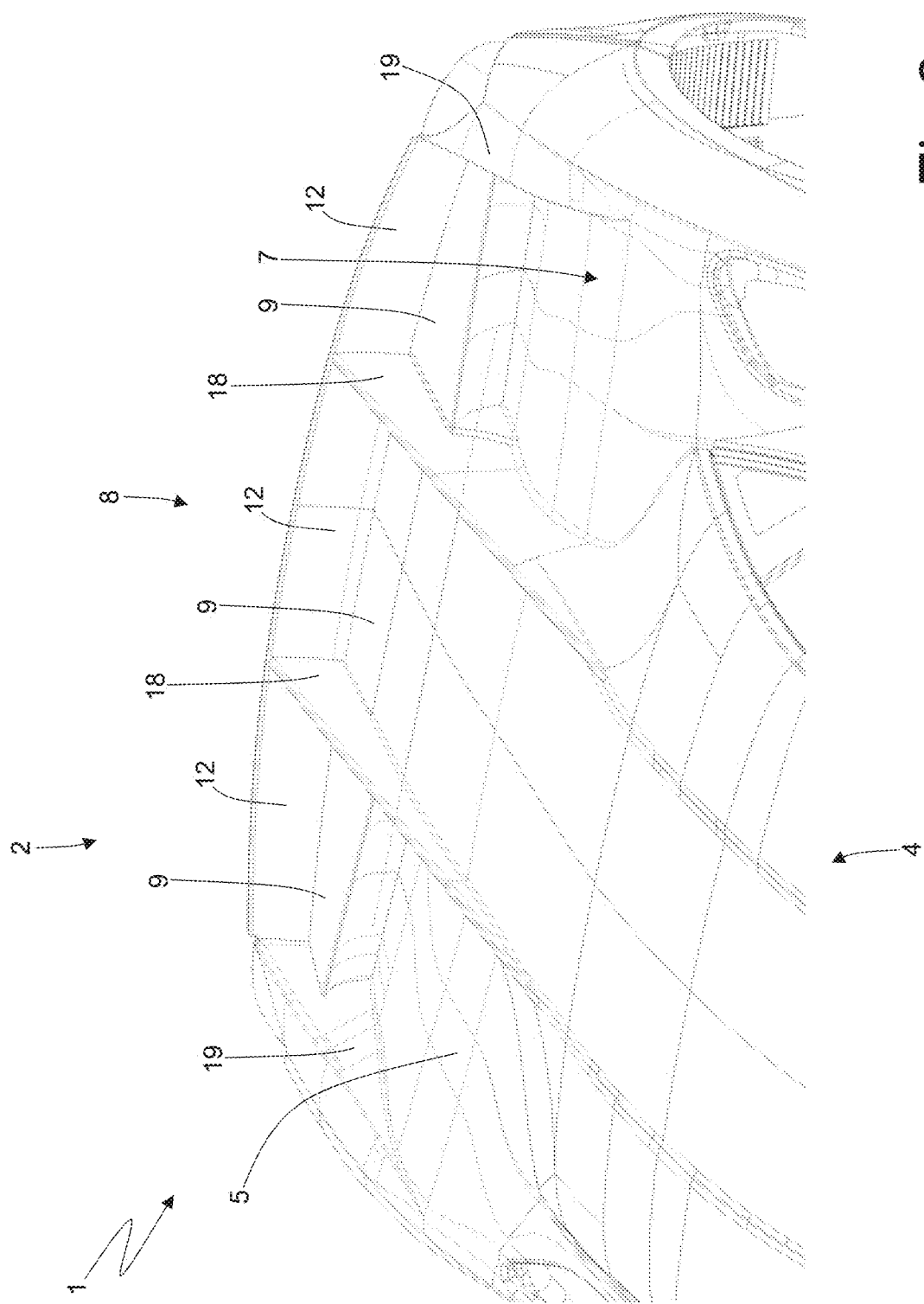
FIGS. 3 and 4 are two enlarged-scale views of the rear area of the car of FIGS. 1 and 2.
Figure 4:
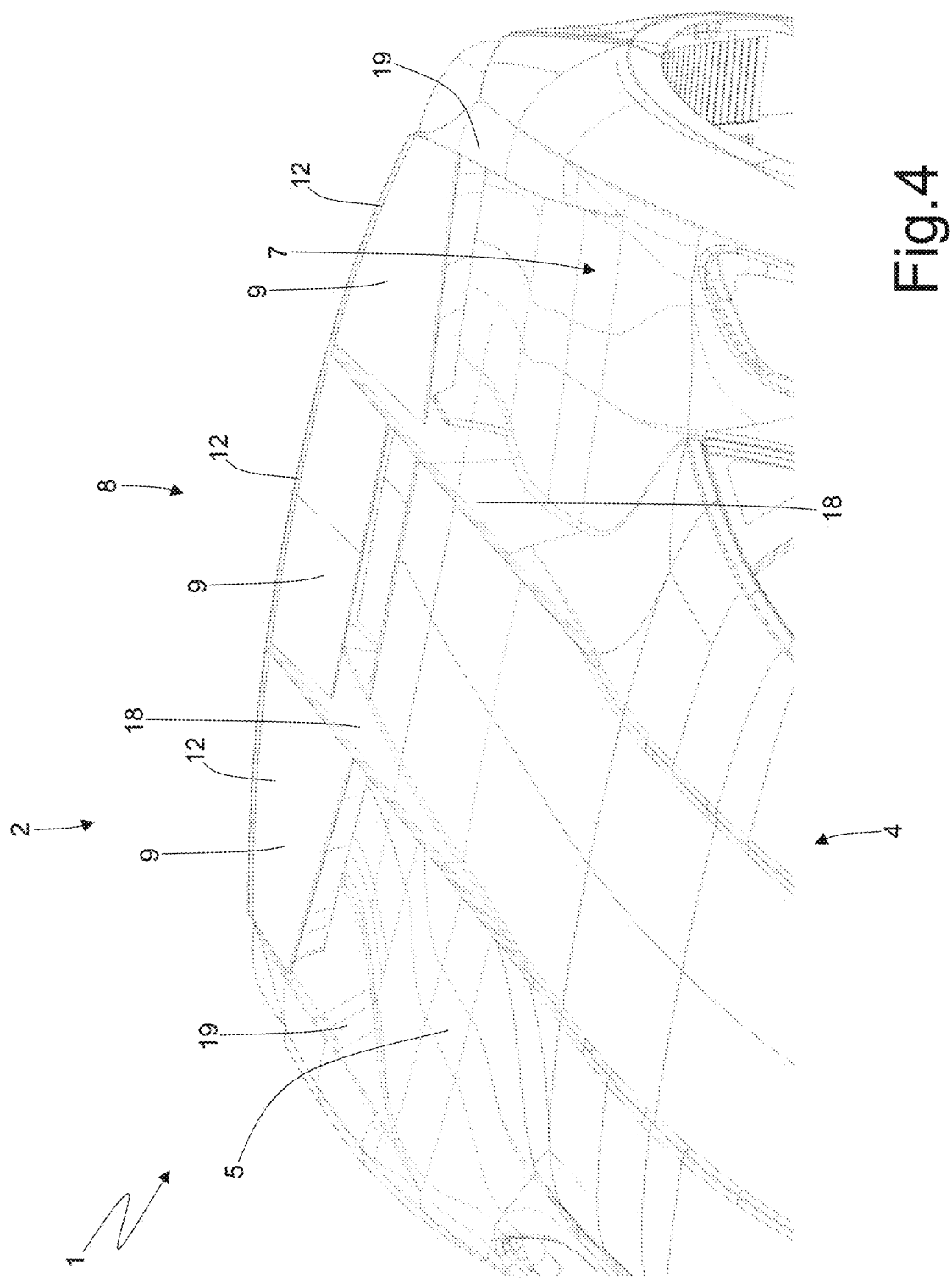
Figure 5:
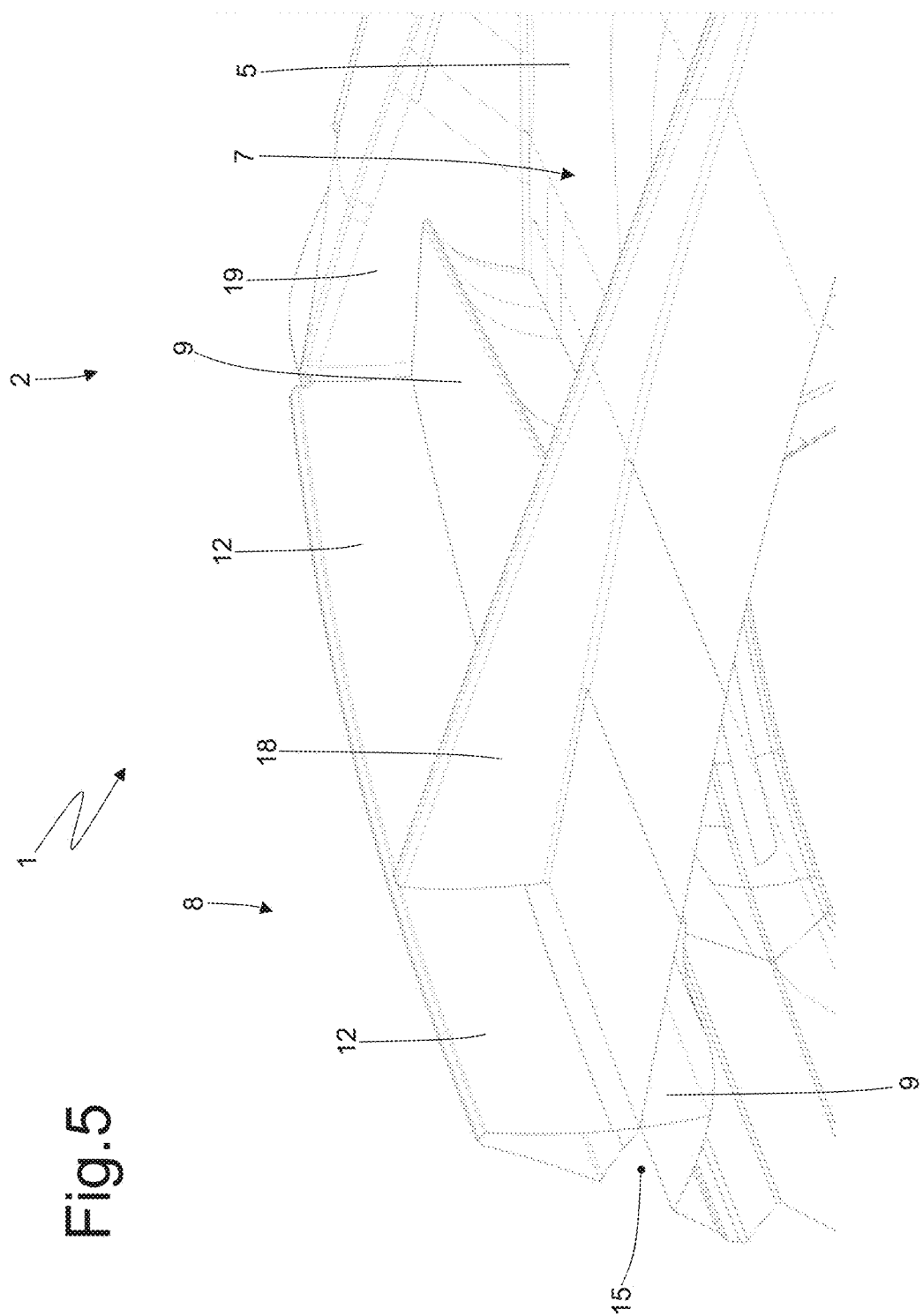
FIGS. 5 and 6 are two perspective and sectional views along a centrally arranged longitudinal section plane of the rear aerodynamic appendage, respectively arranged in a lowered position (maximum downforce) and in a raised position (minimum downforce)
Figure 6:
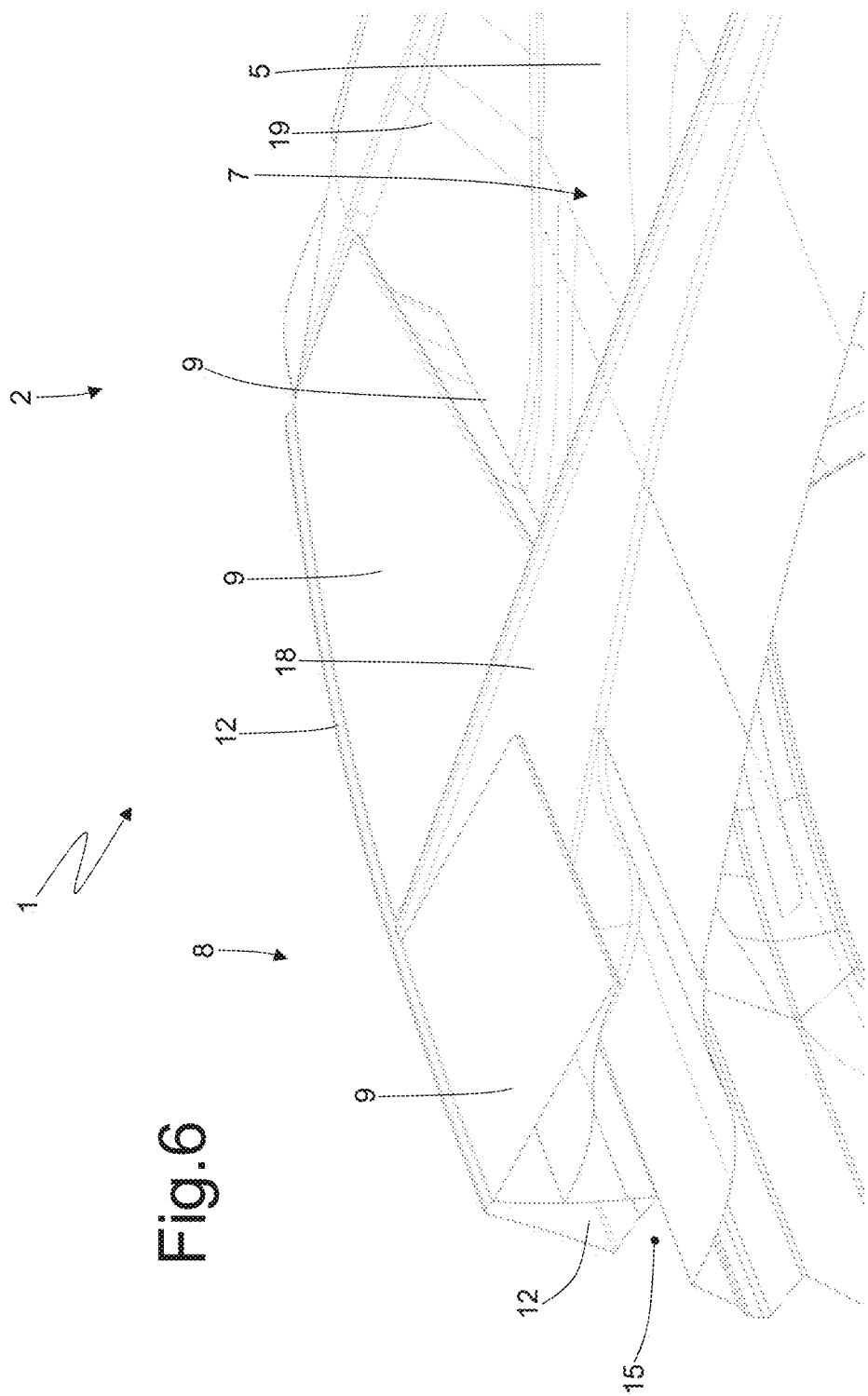
Figure 7:
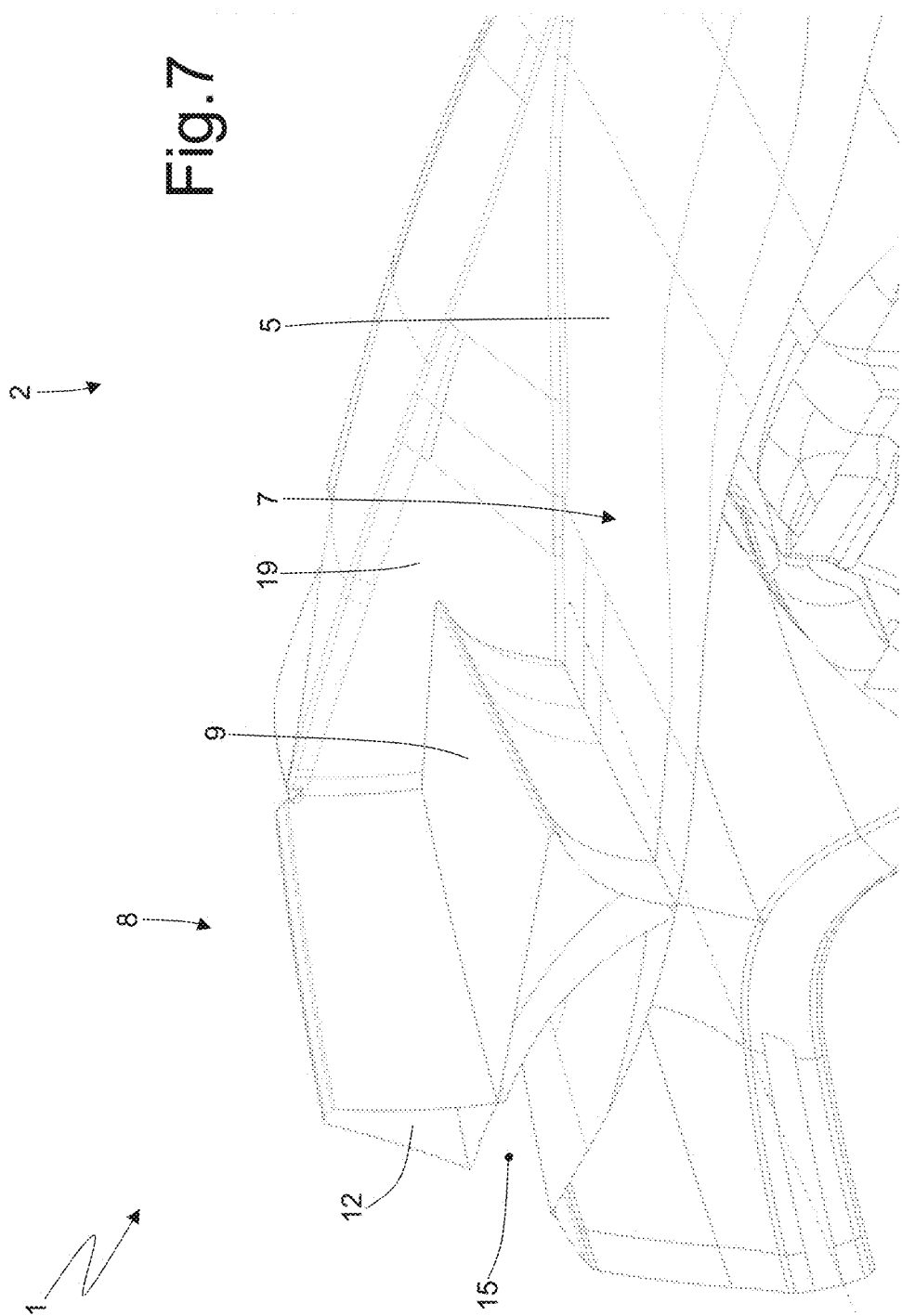
FIGS. 7 and 8 are two perspective and sectional views along a longitudinal section plane laterally arranged with respect to the rear aerodynamic appendage, respectively arranged in a lowered position (maximum downforce) and in a raised position (minimum downforce)
Figure 8:
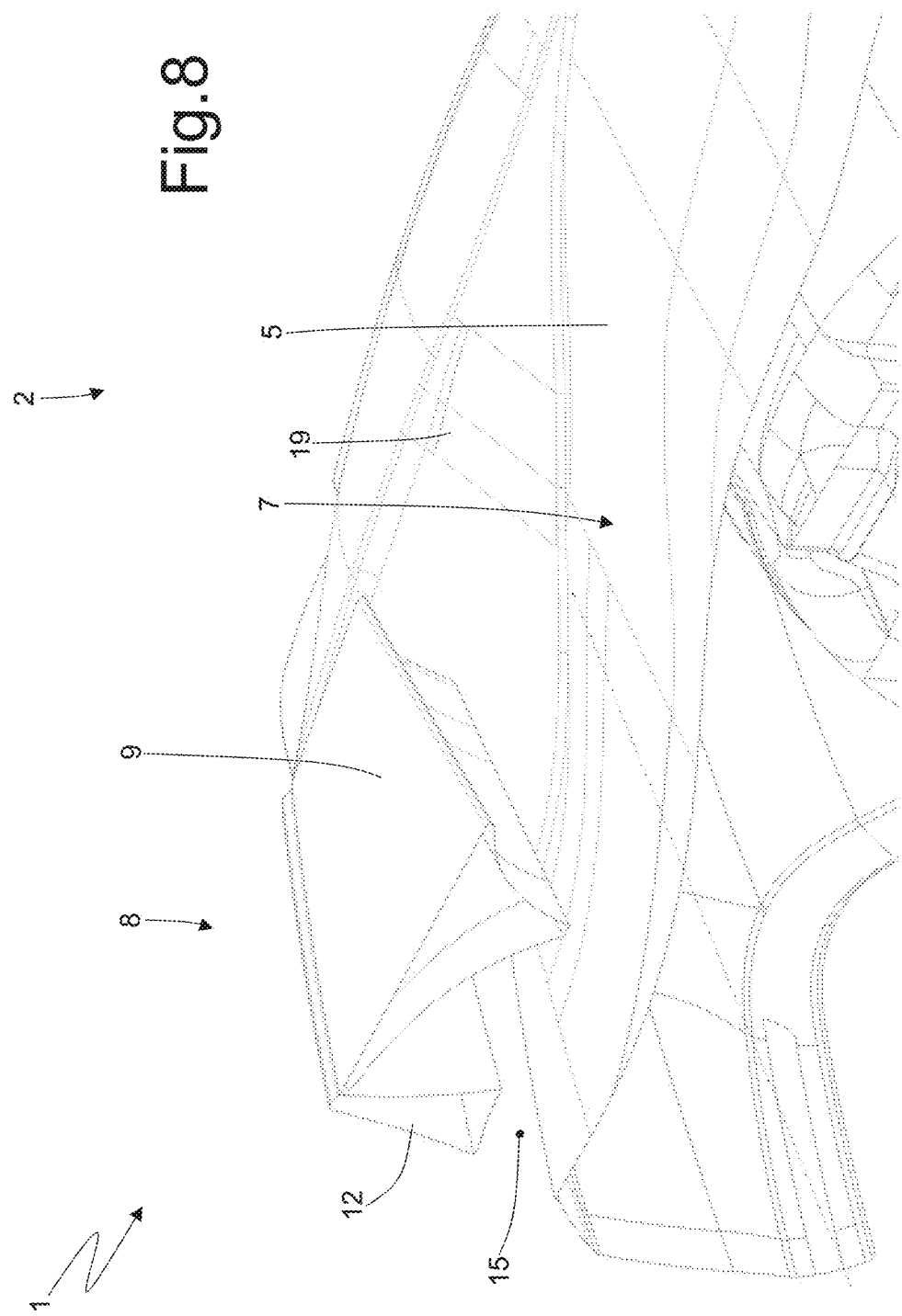

According to what better shown in FIGS. 3 and 4, the aerodynamic appendage 8 comprises three movable elements 9, which are arranged side by side. Each movable element 9 is movably mounted to move between a lowered position (maximum downforce, shown in FIGS. 1, 3, 5, 7, 9 and 11) in which the movable element 9 rests on the upper surface 7 of the rear hood 5 allowing an air flow only over the movable element 9, and a raised position (minimum downforce, shown in FIGS. 2, 4, 6, 8, 10 and 12) in which the movable element 9 is raised and separated from the upper surface 7 of the rear hood 5 allowing an air flow both over the movable element 9 and under the movable element 9.

Figure 9:
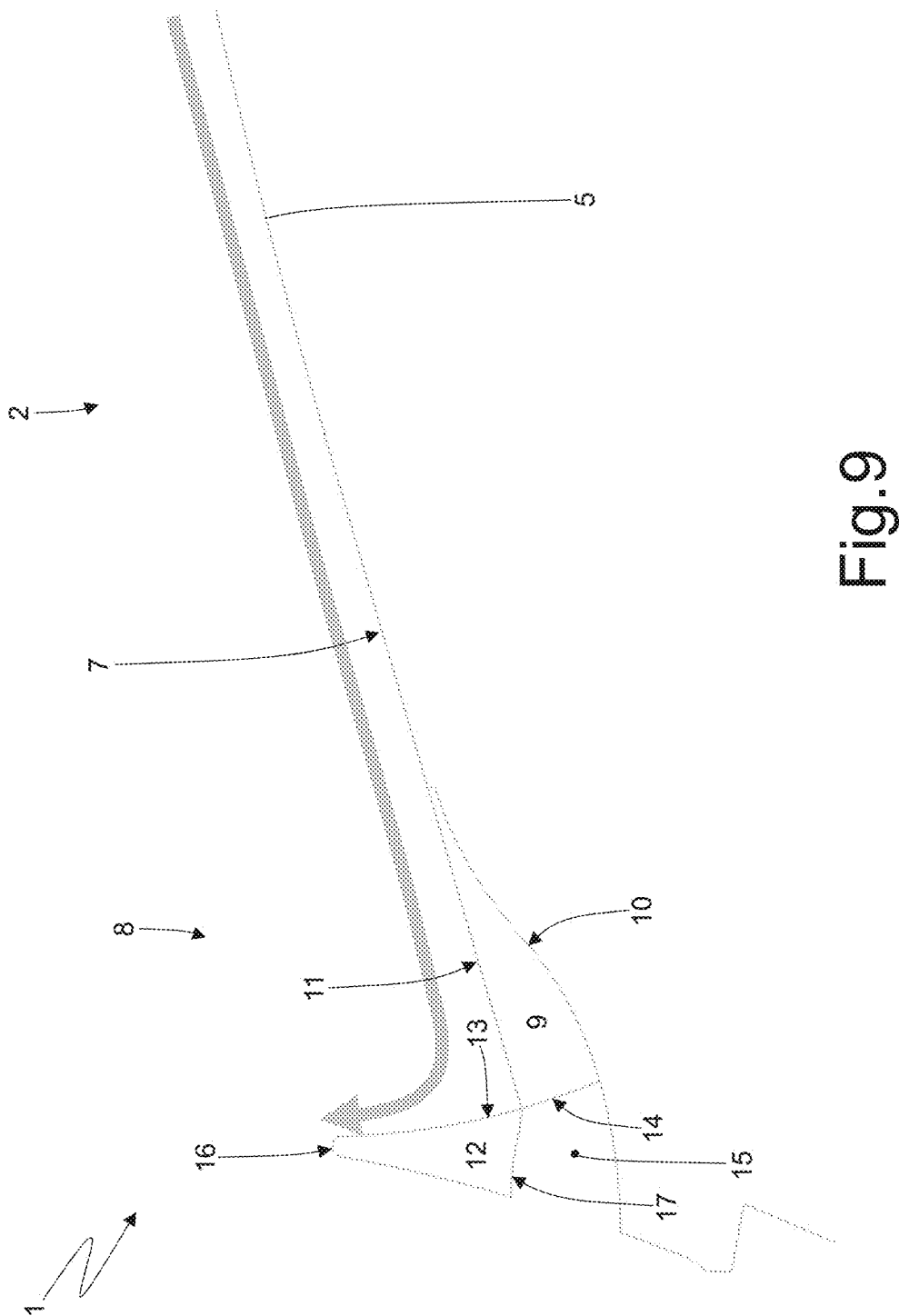
FIGS. 9 and 10 are two schematic and sectional views along a longitudinal section plane centrally arranged in the rear aerodynamic appendage, respectively arranged in a lowered position (maximum downforce) and in a raised position (minimum downforce)
Figure 11:
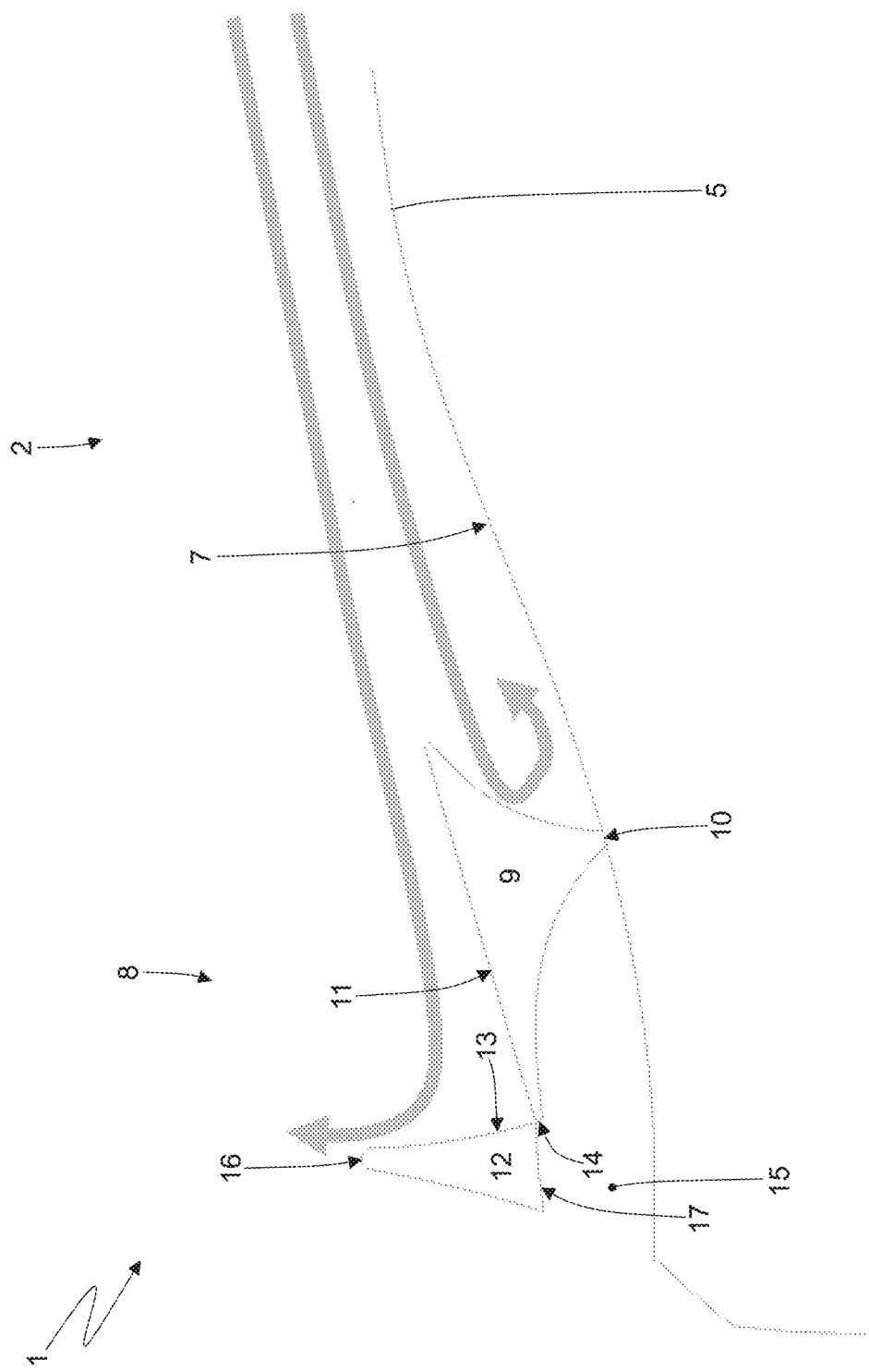
FIGS. 11 and 12 are two schematic and sectional views along a longitudinal section plane laterally arranged with respect to the rear aerodynamic appendage, respectively arranged in a lowered position (maximum downforce) and in a raised position (minimum downforce).

As better shown in FIGS. 9 and 11, when each movable element 9 is arranged in the lowered position (maximum downforce), the movable element 9 rests on the upper surface 7 of the rear hood 5 and projects from the upper surface 7 of the rear hood 5, i.e. a lower surface 10 of each movable element 9 rests (with contact) on the upper surface 7 of the rear hood 5. Thus, when each movable element 9 is arranged in the lowered position (maximum downforce), the air flow entering the movable element 9 cannot flow under the movable element 9 and is forced to flow exclusively over the movable element 9, thus touching an upper surface 11 of the movable element 9.

Figure 10:
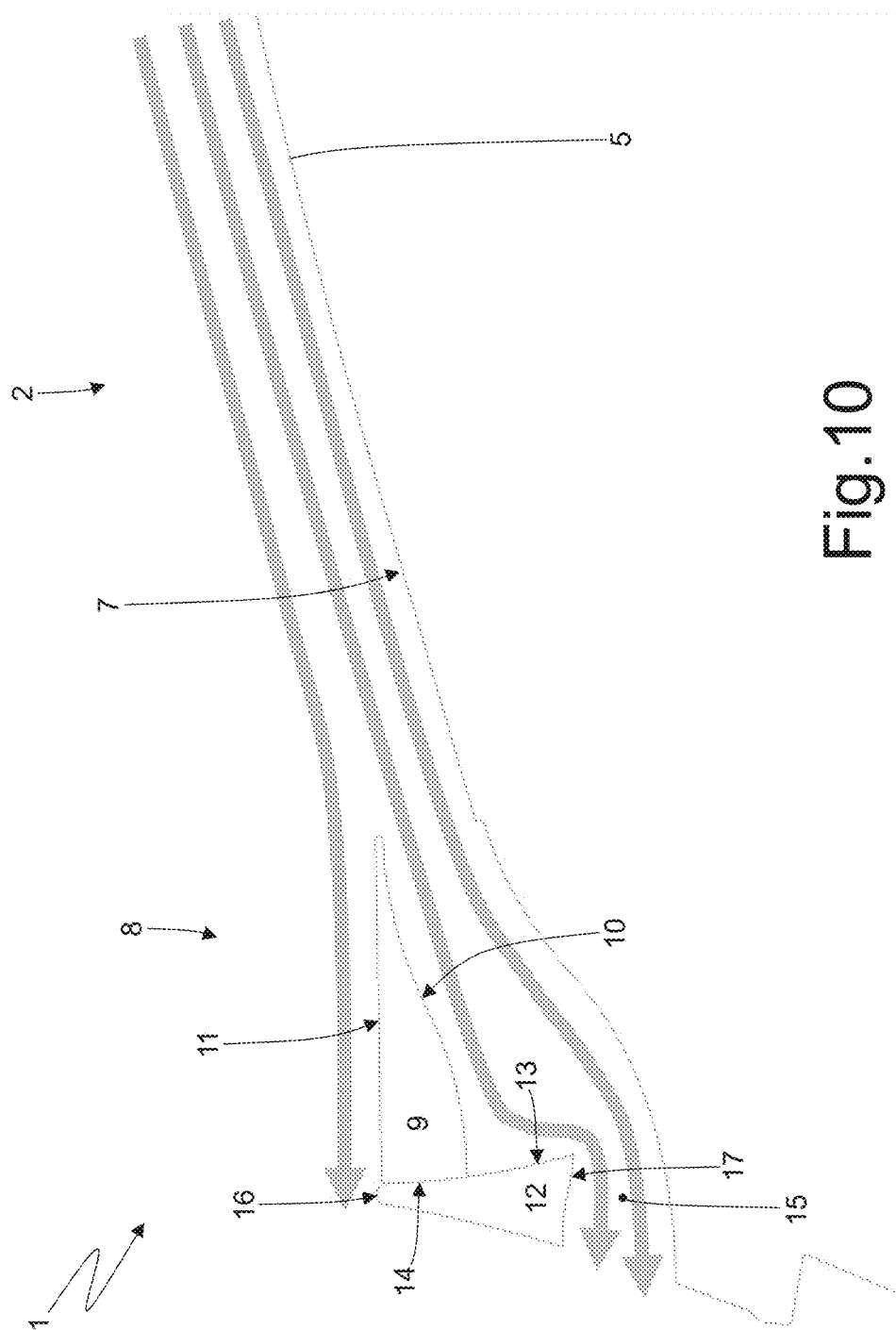
Figure 12:
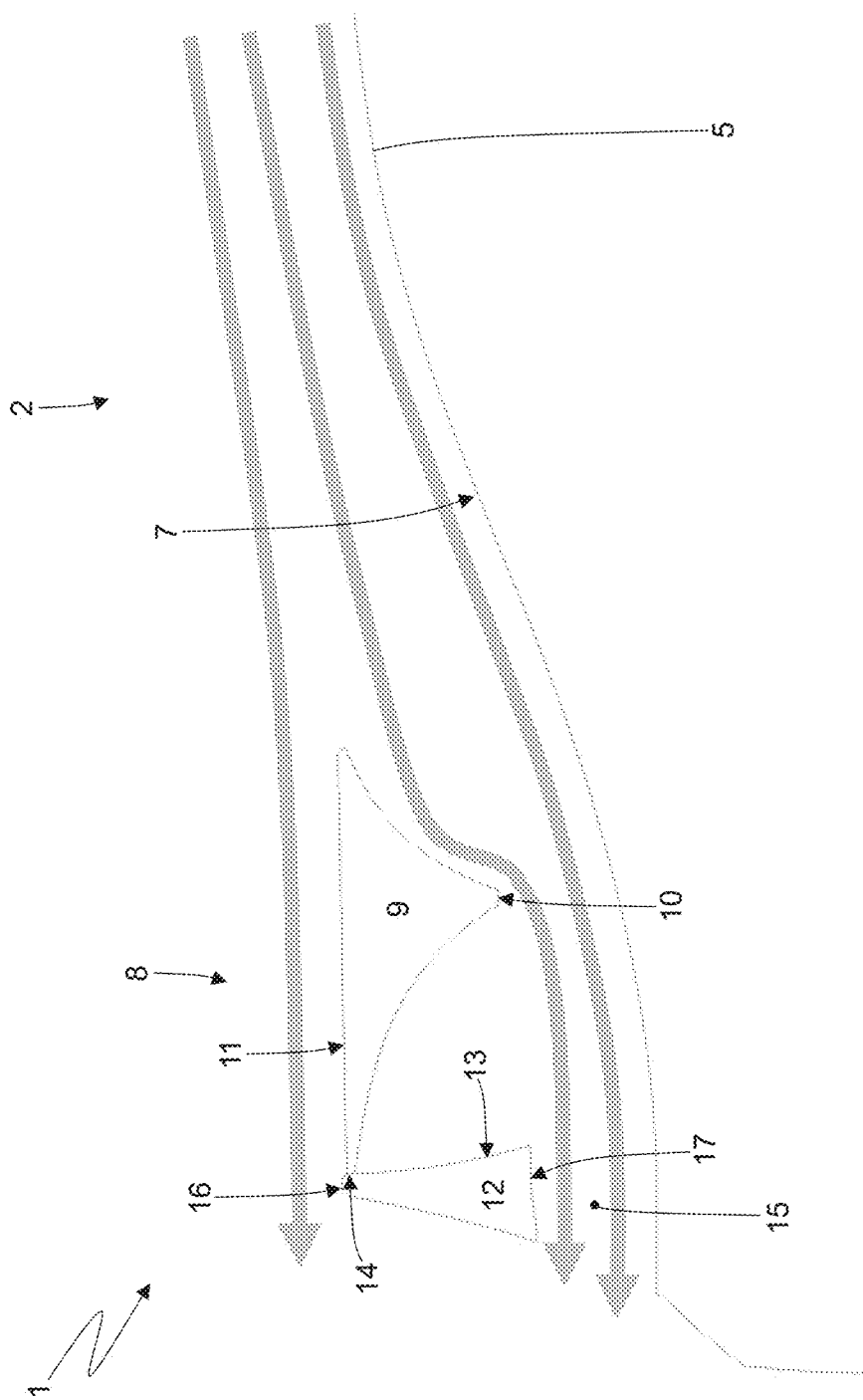

As better shown in FIGS. 10 and 12, when each movable element 9 is arranged in the raised position (minimum downforce), the movable element 9 is (relatively) far from the upper surface 7 of the rear hood 5 (i.e. it is raised with respect to the upper surface 7 of the rear hood 5) so that there is a remarkably sized gap between the upper surface 7 of the rear hood 5 and the lower surface 10 of the movable element 9. Then, when each movable element 9 is arranged in the raised position (minimum downforce), a part of the air flow hitting the movable element 9 passes over the movable element 9, thus touching the upper surface 11 of the movable element 9, and the remaining part of the air flow hitting the movable element 9 passes under the movable element 9, thus touching the lower surface 10 of the movable element 9.

According to a preferred but non-limiting embodiment, better shown in FIGS. 3 and 4, the aerodynamic appendage comprises three fixed elements 12, each of which is arranged behind a corresponding movable element 9, is mounted in a stable and unchangeable position over the rear hood 5 (namely, it does not has any type of shift/movement with respect to the rear hood 5), and is in contact with the movable element 9. According to what better shown in FIGS. 9-12, each fixed element 12 has a front surface 13 against which a rear surface 14 of the movable element 9 rests and slides. As previously stated, each fixed element 12 is raised with respect to the upper surface 7 of the rear hood 5 to be arranged at a certain distance from the upper surface 7 and then defining with the upper surface 7 a vent channel 15, which is free at the front (namely, not closed) when the movable element 9 is arranged in the raised position (minimum downforce, shown in FIGS. 2, 4, 6, 8, 10 and 12) and is closed by the movable element 9 when the movable element 9 is arranged in the lowered position (maximum downforce, shown in FIGS. 1, 3, 5, 7, 9 and 11).

According to a preferred but non-limiting embodiment shown in FIGS. 10 and 12, when the movable element 9 is arranged in the raised position (minimum downforce), the upper surface 11 of each movable element 9 is arranged at the same height as an upper surface 16 of the corresponding fixed element 12. Accordingly, and as shown in FIGS. 9 and 11, when the movable element 9 is arranged in the lowered position (maximum downforce), the upper surface 11 of each movable element 9 is lower than the upper surface 16 of the corresponding fixed element 12.

According to a preferred but non-limiting embodiment shown in FIGS. 9 and 11, when the movable element 9 is arranged in the lowered position (maximum downforce), the upper surface 11 of each movable element 9 is arranged at the same height as a lower surface 17 of the corresponding fixed element 12.

According to a preferred but non-limiting embodiment shown in FIGS. 9 to 12, the upper surface 11 of each movable element 9 is flat and, according to a preferred but non-limiting embodiment shown in FIGS. 10 and 12, the upper surface 11 of each movable element 9 is flat. According to a preferred but non-limiting embodiment shown in FIGS. 10 and 12, the upper (flat) surface 11 of each movable element 9 is arranged horizontally.

As better shown in FIGS. 3 and 4 and as previously stated, the aerodynamic appendage 8 comprises three movable elements 9 and as many fixed elements 12, each of which is coupled to a corresponding movable element 9. Accordingly, there is a single central movable element 9 (namely, centrally arranged) and two side movable elements 9 (namely, arranged in a side position, one on the right and the other on the left); the central movable element 9 is arranged in the middle between the two side movable elements 9. According to a preferred but non-limiting embodiment, the rear hood 5 has two longitudinal ribs 18, each of which separates two movable elements 9 arranged side by side, namely separates the central movable element 9 from the two side movable elements 9. At the back, each longitudinal rib 18 rests on the front surface 13 of the corresponding fixed elements 12. The rear hood 5 further has two side boards 19, which laterally delimit the area affected by the aerodynamic appendage 8 and on which the outer side walls of the two side movable elements 9 rest.

According to a preferred but non-limiting embodiment shown in the accompanying figures, the two side movable elements 9 (shown in detail in FIGS. 7-8 and 11-12) have a shape different from the one of the single central movable element 9 (shown in FIGS. 5-6 and 9-10). In particular, the central movable element 9 has, in its cross section, an increasing vertical thickness that is minimum at the front and maximum at the back (as shown in FIGS. 5-6 and 9-10. In this embodiment, the lower surface 10 of each movable element 9 reproduces in negative the shape of the upper surface 7 of the rear hood 5 facing it, whereas the lower surface 10 of each side movable element 9 has a pointed shape which is oriented downwards and has a vertex resting on the upper surface 7 of the rear hood 5 when the movable element 9 is arranged in the lowered position (maximum downforce, shown in FIG. 12). Furthermore, each side movable element 9 has, in its cross section, a vertical thickness initially increasing up to the vertex and then decreasing so that the vertical thickness is maximum at the vertex and is minimum at the front and at the back.

Each movable element 9 is shaped according to a wing profile that generates downforce (i.e. a downward pull) when the movable element 9 is in the raised position (minimum downforce, shown in FIGS. 2, 4, 6, 8, 10 and 12), in which the movable element 9 is raised and separated from the upper surface 7 of the rear hood 5 allowing an air flow both over the movable element 9 and under the movable element 9. In other words, the cross section of each movable element 9 is designed to ensure that the flow of air passing over and under the movable element 9 overall generates a downforce. In particular, the shape of the central movable element 9 is designed to generate a greater downforce (also taking into account the presence of the corresponding fixed element 12) when the central movable element 9 is arranged in the raised position (minimum downforce, shown in FIGS. 2, 4, 6, 8, 10 and 12), whereas the shape of the side movable elements 9 is designed to overall generate a smaller downforce (also taking into account the presence of the corresponding fixed elements 12) but also a smaller aerodynamic drag when the side movable elements are arranged in the lowered position (maximum downforce, shown in FIGS. 1, 3, 5, 7, 9 and 11). According to a different embodiment not shown, the movable elements 9 have a shape different from the one shown in the attached figures. According to a different embodiment not shown, all three movable elements 9 have the same shape.

As better shown in FIGS. 9 and 11, when each movable element 9 is arranged in the lowered position (maximum downforce), the movable element 9 rests on the upper surface 7 of the rear hood 5 and projects from the upper surface 7 of the rear hood 5; namely, the lower surface 10 of each movable element 9 rests (with contact) on the upper surface 7 of the rear hood 5. Thus, when each movable element 9 is arranged in the lowered position (maximum downforce), the air flow entering the movable element 9 cannot flow under the movable element 9 and is forced to flow exclusively over the movable element 9 touching an upper surface 11 of the movable element 9. Consequently, there cannot be an air flow under the corresponding fixed element 12 and through the vent channel 15, since the vent channel 15 is anteriorly closed by the movable element 9.

As better shown in FIGS. 10 and 12, when each movable element 9 is arranged in the raised position (minimum downforce), the movable element 9 is (relatively) far from the upper surface 7 of the rear hood 5 (i.e. it is raised from the upper surface 7 of the rear hood 5) so that there is a remarkably sized gap between the upper surface 7 of the rear hood 5 and the lower surface 10 of the movable element 9. Then, when each movable element 9 is arranged in the raised position (minimum downforce), a part of the air flow hitting the movable element 9 passes over the movable element 9 touching the upper surface 11 of the movable element 9 and the remaining part of the air flow hitting the movable element 9 passes under the movable element 9, touching the lower surface 10 of the movable element 9. Consequently, there is an air flow under the corresponding fixed element 12 and through the vent channel 15, since the vent channel 15 is not anteriorly closed by the movable element 9.

According to a preferred but non-limiting embodiment shown in the attached figures, the three fixed elements 12 (i.e. the central fixed element 12 and the two side fixed elements 12) all have the same shape and are rigidly connected to each other (preferably, the three fixed elements 12 form together a single indivisible monolithic body).

According to a different and perfectly equivalent embodiment, not shown, a single monolithic movable element 9 is provided instead of three movable elements 9 arranged side by side.

An actuator (preferably, but not necessarily an electric one) is provided, which is mechanically connected to the movable elements 9 to vary the position of the movable elements 9. The actuator can be of the ON/OFF type (namely, it can allow the movable elements 9 to take only the two end positions) or it can allow the movable elements 9 to take also intermediate positions between the two end positions. The actuator can control in exactly the same way all three movable elements 9, or it could control independently (and therefore in a differentiated way) the central movable element 9 with respect to the two side movable elements 9. In the preferred but non-limiting embodiment shown in the accompanying figures, the movement of the movable elements 9 is a rotation (or includes a rotation) about a virtual rotation axis arranged relatively far from the movable elements 9 and in a front position with respect to the movable elements 9.

In the lowered position (maximum downforce, shown in FIGS. 1, 3, 5, 7, 9 and 11) the air flow entering each movable element 9 cannot flow under the movable element 9 and is forced to flow exclusively over the movable element 9 touching an upper surface 11 of the movable element 9; the air flow hitting each movable element 9 is then driven against the corresponding fixed element 12 which diverts the air flow upwards generating a significant aerodynamic downward pull (i.e. generating a significant downforce) compared to a significant aerodynamic drag.

In the raised position (minimum downforce, shown in FIGS. 2, 4, 6, 8, 10 and 12), a part of the air flow engaging the movable element 9 passes over the movable element 9, touching the upper surface of the movable element 9 and the remaining part of the air flow engaging the movable element 9 passes under the movable element 9 touching the lower surface 10 of the movable element 9 and subsequently passing through the corresponding vent channel 15. The air flow hitting each movable element 9 has therefore a minimum (almost nil) impact against the corresponding fixed element 12, thus generating neither a significant aerodynamic downward pull (i.e. a significant downforce) nor a significant aerodynamic drag.

Basically, by varying the position of the movable elements 9 it is possible to increase/decrease the downforce (i.e. the downward pull) generated by the aerodynamic appendage 8 by decreasing/increasing at the same time the aerodynamic drag generated by the aerodynamic appendage 8. Thus, the aerodynamic action of the aerodynamic appendage 8 can be adapted (optimized with respect to) to the state of motion of the car 1 by acting on the position of the movable elements 9.

The embodiments herein described can be combined without departing from the scope of protection of the present invention.

The car 1 described above has numerous advantages.

First, the aerodynamic appendage 8 of the car 1 described above has a high aerodynamic efficiency, namely it has a very favourable ratio between the aerodynamic downforce and the corresponding aerodynamic drag.

Furthermore, the aerodynamic appendage 8 of the car 1 described above is able to generate a very high aerodynamic downforce in spite of its relatively small dimensions.

The aerodynamic appendage 8 of the car 1 described above allows adjusting its aerodynamic action in a simple, fast and precise way by increasing or decreasing in real time the generated aerodynamic downforce (obviously, accordingly decreasing or increasing the generated aerodynamic drag). Finally, the aerodynamic appendage 8 of the car 1 described above is simple and inexpensive to manufacture.

LIST OF REFERENCE NUMBERS OF FIGURES 1 car
2 bodywork
3 interior compartment
4 doors
5 rear hood
6 front hood
7 upper surface
8 aerodynamic appendage
9 movable element
10 lower surface
11 upper surface
12 fixed element
13 front surface
14 back surface
15 vent channel
16 upper surface
17 lower surface
18 longitudinal ribs
19 side boards

The invention claimed is:

1. A car (1) comprising:
 a passenger compartment (3);
 a front hood (6), which is arranged before the passenger compartment (3);
 a rear hood (5), which is arranged behind the passenger compartment (3) and has an upper surface (7); and
 an aerodynamic appendage (8), which is arranged in the area of the rear hood (5) and on the upper surface (7) of the rear hood (5) and comprises at least one movable element (9) that is movably mounted to move between a lowered position, in which the movable element (9) rests on the upper surface (7) of the rear hood (5) allowing an air flow only over the movable element (9), and a raised position, in which the movable element (9) is raised and separated from the upper surface (7) of the rear hood (5) allowing an air flow both over the movable element (9) and under the movable element (9);
 wherein the movable element (9) in the lowered position produces the maximum downforce and the maximum aerodynamic drag, and the movable element (9) in the raised position produces the minimum downforce and the minimum aerodynamic drag;
 wherein the aerodynamic appendage (8) comprises a fixed element (12), which is arranged behind the movable element (9), is mounted in a stable and unchangeable position and is in contact with the movable element (9);
 wherein the fixed element (12) is raised relative to the upper surface (7) of the rear hood (5) so as to be arranged at a given distance from the upper surface (7) and, hence, define a vent channel (15) between the upper surface (7) of the rear hood (5) and the fixed element (12);
 wherein the vent channel (15) is free when the movable element (9) is arranged in the raised position and is closed by the movable element (9) when the movable element (9) is arranged in the lowered position.

2. A car (1) according to claim 1, wherein the fixed element (12) has a front surface (13) against which a rear surface (14) of the movable element (9) rests and slides.

3. A car (1) according to claim 1, wherein when the movable element (9) is in the raised position, an upper surface (11) of the movable element (9) is arranged at the same height as an upper surface (16) of the fixed element (12).

4. A car (1) according to claim 1, wherein, when the movable element (9) is arranged in the lowered position, an upper surface (11) of the movable element (9) is lower than an upper surface (16) of the fixed element (12).

5. A car (1) according to claim 1, wherein, when the movable element (9) is arranged in the lowered position, an upper surface (11) of the movable element (9) is arranged at the same height as a lower surface (17) of the fixed element (12).

6. A car (1) according to claim 1, wherein an upper surface (11) of the movable element (9) is flat and is arranged horizontally when the movable element (9) is arranged in the raised position.

7. A car (1) according to claim 1, wherein a lower surface (10) of the movable element (9) reproduces in negative the shape of the upper surface (7) of the rear hood (5) facing it.

8. A car (1) according to claim 1, wherein a lower surface (10) of the movable element (9) has a pointed shape, which is oriented downwards and has a vertex that rests on the upper surface (7) of the rear hood (5) when the movable element (9) is arranged in the lowered position.

9. A car (1) according to claim 8, wherein the movable element (9) has, in its cross section, a vertical thickness that at first increases up to the vertex and then decreases, so that the vertical thickness is maximum in the area of the vertex and minimum at the front and at the back.

10. A car (1) according to claim 1 and comprising three movable elements (9), which are arranged side by side.

11. A car (1) according to claim 10, wherein the rear hood (5) comprises two longitudinal ribs (18), each separating two movable elements (9) arranged side by side.

12. A car (1) according to claim 1, wherein the rear hood (5) comprises two side boards (19), which laterally delimit the area affected by the aerodynamic appendage (8) and on which outer side walls of the movable element (9) rest.

13. A car (1) according to claim 1, wherein it is provided an actuator, which is mechanically connected to the movable element (9) so as to vary the position of the movable element (9).

14. A car (1) according to claim 1, wherein, when the movable element (9) is arranged in the lowered position, the movable element (9) rests on the upper surface (7) of the rear hood (5) and projects from the upper surface (7) of the rear hood (5).

15. A car (1) according to claim 1, wherein:

when the movable element (9) is arranged in the raised position, a part of the air flow hitting the movable element flows over the movable element (9) touching an upper surface (11) of the movable element (9), and the remaining part of the air flow hitting the movable element (9) flows under the movable element (9) touching a lower surface (10) of the movable element (9); and when the movable element (9) is arranged in the lowered position, the air flow hitting the movable element (9) cannot flow under the movable element (9) and is forced to flow exclusively over the movable element (9) touching an upper surface (11) of the movable element (9).

* * * * *